United States Patent Office 3,487,385

Patented Dec. 30, 1969

3,487,385

FERROMAGNETIC THIN FILM MEMORY DEVICE

Sukeyoshi Sakai, Kawasaki-shi, Japan, assignor to Fujitsu Limited, Kawasaki, Japan, a corporation of Japan Filed Sept. 6, 1966, Ser. No. 577,423
Claims priority, application Japan, Sept. 16, 1965, 40/56,825
Int. Cl. G11b 5/00
U.S. Cl. 340—174 9 Claims

ABSTRACT OF THE DISCLOSURE

Each of a plurality of word conductors of a thin film memory device is of elongated narrow U configuration having one portion in close operative proximity with one part of the surface of each of a plurality of memory conductors and another portion in close operative proximity with another diametrically opposite part of the surface of each memory conductor. A coating of soft magnetic material covers the surface area of each of the word conductors except in the areas of close operative proximity witth the memory conductors.

DESCRIPTION OF THE INVENTION

The present invention relates to a thin film memory device. More particularly, the invention relates to a ferromagnetic thin film memory device.

Ferromagnetic thin films are utilized as memory elements in high speed electronic computers, since they considerably shorten readin and readout time. The time necessary to change a stored information is called the switching time. If thin films are utilized, the switching time may be reduced to less than $10^{-8}$ second.

A memory element of the type referred to may have the configuration of a flat plate. In the device of the present invention, however, a memory element comprises an electrically conducting wire coated by electroplating or other suitable method with a thin film of a soft magnetic alloy such as, for example, non-magnetostrictive Permalloy, which is a nickel-iron alloy in which the ratio of nickel to iron is about 80 to 20. The memory element is thus a coated or plated wire. The coated memory element or memory wire has the characteristics of uniaxial magnetic anisotropy; that is, the magnetic properties thereof depend upon direction. The material tends to magnetize along determined crystallographic axes, called directions of easy magnetization. The direction of easy magnetization of the magnetic anisotropy is in the thin film of the memory wire. When no external magnetic field is applied, the residual magnetization tends to align parallel or non-parallel witth the direction of easy magnetization. The direction of easy magnetization may be made a circumferential direction of the memory wire at the time that said wire is electroplated.

The memory wire may indicate either of two conditions such as, for example, binary "0" and binary "1," depending upon the orientation of the direction of easy magnetization. A magnetic field may be applied in the direction of hard magnetization at right angles to the direction of easy magnetization to vary the magnetization and read out the condition of the variation as binary "0" or binary "1." Binary "0" or binary "1" may be read in by providing an inversion of the magnetization only when a suitable magnetic field is applied in both the direction of easy magnetization and the direction of hard magnetization and preventing an inversion of the magnetization when a magnetic field is applied in only one of said directions.

A magnetic field may be applied in the direction of hard magnetization at right angles to the direction of easy magnetization by electrically conducting wires which are positioned at right angles with the memory wires. A magnetic field may also be applied in the direction of easy magnetization by the electrically conducting wires which are the cores of the memory wires. If a magnetic field is applied in the direction of hard magnetization at right angles to the direction of easy magnetization by electrically conducting wires positioned at right angles with the memory wires, said electrically conducting wires are called word wires. Although the direction of easy magnetization is the length direction of the memory wires, the present invention relates to the word wires. Since the direction of hard magnetization is at right angles to the length direction of the memory wires, the electrically conducting cores of the memory wires apply the magnetic field in the direction of hard magnetization. The memory wires themselves thus function as the word wires. However, in order to apply a magnetic field in the direction of easy magnetization, wires must be provided at right angles with the memory wires and word wires. Such right angled wires are called digit wires. The invention concerns only the memory wires and the word wires, however.

A high speed, high capacity memory may utilize a matrix comprising a plurality of coated memory wires of the aforedescribed type and a plurality of word wires positioned at right angles with the memory wires. Each unit or bit of information is provided at a point of intersection of a memory wire and a word wire. For proper operation of the matrix as a high speed memory, such matrix must be satisfactorily reliable.

The stray magnetic field produced by a bit of information at the intersection of a memory wire and a word wire often considerably reduces the reliability of operation of the memory matrix. In order to prevent a reduction in reliability, it is necessary to space the word wires a determined distance from each other. However, since electric current is supplied to the electrically conducting cores of the memory wires for the purpose of readin and readout of information, if the word wires are spaced far apart, the memory wires are too long, and the time for a current to flow through a memory wire is too long. This considerably reduces the speed of operation of the memory, so that it no longer functions at high speed. In order to maintain a high speed memory operation, it is thus necessary to provide as short a distance as possible between the word wires so that the length of the memory wires is as short as possible. The requirements of satisfactory reliability and high speed in operation are thus directly opposed with regard to the spacing of the word wires. It has been impossible, prior to the present invention, to simultaneously satisfy these opposed requirements.

In one method, the space between word wires may be reduced by a reduction in the magnitude of electric current supplied to the word wires. This reduces the effect of the stray magnetic field at an intersection of the matrix on the adjacent intersections. However, the magnetic field intensity thus provided may be inadequate to provide a bit of information at the desired intersection. If a magnetic field of sufficient intensity to provide a bit of information at the desired intersection is not supplied by the current in the word wire, the operation of the matrix is not reliable.

The principal object of the present invention is to provide a new and improved ferromagnetic thin film memory device. The memory device of the present invention includes word wires which are closely spaced from each other and which are certainly more closely spaced from each other than those of prior art devices. The current supplied to the word wires of the memory device of the present invention may be reduced in magnitude and the word wires may be closely spaced from each other without adverse effect on the reliability of operation. In the memory device of the present invention, the magnetic field is confined to a determined area so that it does not adversely affect the reliability of operation, even when the magnitude of the current supplied to the word wires is small. The memory device of the present invention is effective, efficient and reliable in operation and is of simple structure.

In accordance with the present invention, in a thin film memory device comprising a matrix arrangement having a plurality of memory conductors and a plurality of word conductors positioned in determined relation to each other and each positioned in determined relation to the others, each of the word conductors having a surface area, each of the memory conductors being in operative proximity with each of the word conductors at determined areas and each of the word conductors being in operative proximity with the memory conductors at the determined areas, a coating of soft magnetic material is provided on each of the word conductors covering the surface area of each of the word conductors except in the areas of immediate operative proximity with the memory conductors.

In order that the present invention may be readily carried into effect, it will now be described with reference to the accompanying drawings, wherein.

Figure 1:
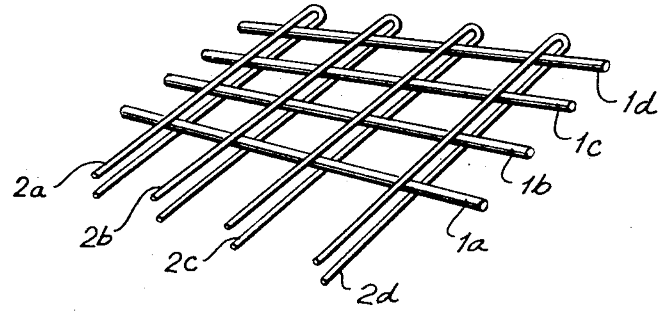
FIG. 1 is a schematic diagram, in perspective, of an embodiment of a memory matrix utilizing the ferromagnetic thin film memory device of the present invention.

In FIG. 1, a memory matrix comprises a plurality of memory wires 1_a_, 1_b_, 1_c_ and 1_d_ each coated with a thin film of a soft magnetic alloy such as, for example, Permalloy. The memory wires 1_a_, 1_b_, 1_c_ and 1_d_ each have the characteristics of uniaxial magnetic anisotropy with a direction of easy magnetization in a circumferential direction. The memory wires 1_a_, 1_b_, 1_c_ and 1_d_ are coplanarly positioned in parallel, equidistant relation to each other. Although only four memory wires are shown in FIG. 1, a great number of memory wires may be utilized.

A plurality of word wires 2_a_, 2_b_, 2_c_ and 2_d_ are provided at right angles to the memory wires 1_a_, 1_b_, 1_c_ and 1_d_ and may comprise a great number rather than the four shown in FIG. 1. Each of the word wires 2_a_, 2_b_, 2_c_ and 2_d_ is of elongated, narrow, U configuration, so that each of said wires has two principal portions, one extending on one side of and contacting each of the memory wires and the other extending on the other side of and contacting each of said memory wires. Thus, the two principal portions of each word wire 2_a_, 2_b_, 2_c_ and 2_d_ are spaced from each other by the diameter of the memory wires 1_a_, 1_b_, 1_c_ and 1_d_ and are parallel to each other and coplanar in a plane at right angles to the plane of the memory wires.

The principal portions of each of the word wires on one side of the memory wires are coplanarly positioned in parallel, equidistant relation to each other in a plane parallel to the plane of the memory wires. The principal portions of each of the word wires on the other side of the memory wires are coplanarly positioned in parallel, equidistant relation to each other in a plane parallel to the plane of the memory wires.

The word wires 2_a_, 2_b_, 2_c_ and 2_d_ conduct electrical current to the memory wires 1_a_, 1_b_, 1_c_ and 1_d_ to provide a magnetic field in the direction of hard magnetization.

Figure 2:
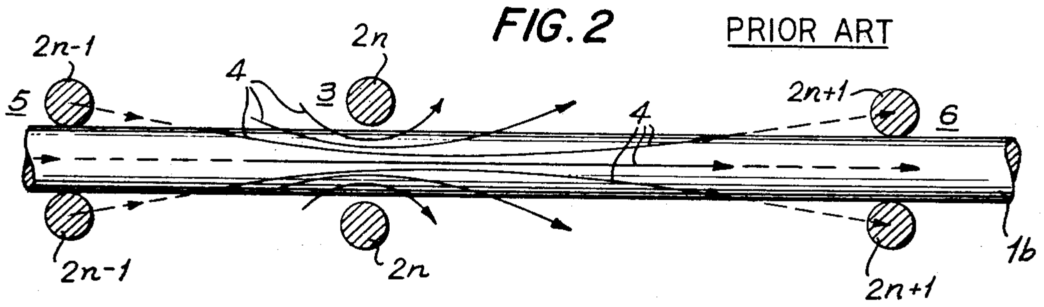
FIG. 2 is a sectional view of a portion of a memory matrix of the prior art.

FIG. 2 illustrates the leakage of magnetic flux from the magnetic field produced at an intersection of a memory wire and a word wire to an adjacent intersection. In FIG. 2, the magnetic field produced at an intersection 3 by a flow of current through a word wire 2_n_ comprises a plurality of flux lines 4. The intersection 3 is that of the word wire 2_n_ with one of the memory wires such as, for example, 1_b_. The stray magnetic field reaches each of the adjacent word wires $2n-1$ and $2n+1$ and may adversely affect the information content at each of the intersections 5 and 6, respectively, of said word wires with the memory wire 1_b_. The stray magnetic field at the intersection 3 thus reduces the reliability of operation of the memory matrix by distorting the information content at each of the intersections 5 and 6.

In accordance with the present invention, the stray magnetic field at each intersection is considerably reduced, so that it does not adversely affect the information content at the adjacent intersections and to permit the word wires to be closely spaced from each other, so that the matrix operates as a high speed memory with great reliability. The stray magnetic field is considerably reduced by preventing leakage thereof, and this is achieved, in accordance with the present invention, by providing a magnetic circuit for the magnetic flux to confine such flux to a determined area. A magnetic circuit is provided for each of the word wires 2 (FIG. 3) by covering it with any suitable soft magnetic material.

Figure 3:
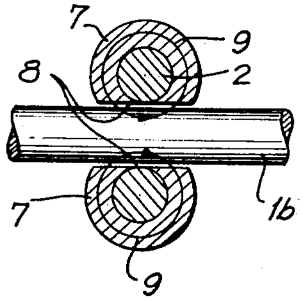
FIG. 3 is a sectional view of a portion of a memory matrix including an embodiment of the ferromagnetic thin film memory device of the present invention.

As shown in FIG. 3, each of the word wires 2 is covered by a suitable soft magnetic material 7 over its entire surface, except those portions which are in operative proximity or electrical contact with the memory wires such as the memory wire 1_b_ shown in FIG. 3. A suitable soft magnetic material 7 is a nickel, iron, molybdenum alloy called molybdenum Permalloy, in which the nickel, iron, molybdenum ratio is 79:17:4. The electrically conducting core of each word wire 2 comprises any suitable electrically conductive material such as, for example, copper.

In the embodiment of FIG. 3, the word wire 2 is of circular cross-section and is completely covered with the soft magnetic material 7 except for the portions 8 which are in operative proximity or electrical contact with the memory wire 1_b_. The flux lines of the magnetic field at the intersection are thus directed through the soft magnetic material 7, as shown by the flux lines 9 in FIG. 3.

Figure 4:
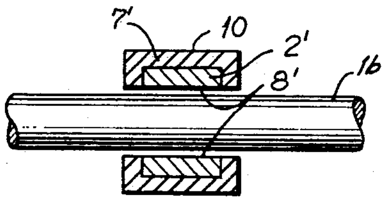
FIG. 4 is a sectional view of a portion of a memory matrix including a modification of the embodiment of FIG. 3.

In the modification of FIG. 4, the word wire 2' is of rectangular cross-section and is easier to manufacture than the circular cross-section word wire 2 of FIG. 3. In FIG. 4, the soft magnetic material 7' covers the outer and side surfaces of the electrically conducting core of the word wire 2' and the inner surfaces 8' in operative proximity or electrical contact with the memory wire 1_b_ is not covered.

Figure 5:
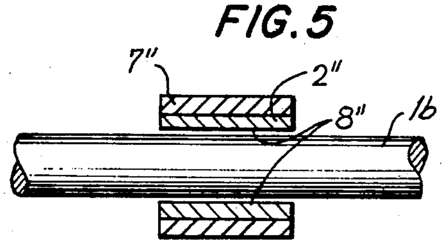
FIG. 5 is a sectional view of a portion of a memory matrix including another modification of the embodiment of FIG. 3.

In the modification of FIG. 5, the word wire 2'' is of rectangular cross-section having inner and outer surfaces in operative proximity with and spaced from the memory wire 1_b_ and side surfaces which are so small in dimension relative to said inner and outer surfaces that the word wire is extremely thin in its dimension perpendicular to the memory wire. Thus, in FIG. 5, only the outer portion 10 (FIG. 4) of the soft magnetic material 7' covering the word wire 2' of FIG. 4 is utilized as the soft magnetic material 7''. The soft magnetic material 7'' covering the outer surface of the electrically conducting core of the word wire 2'' is sufficient as a magnetic circuit to direct and confine the magnetic flux at the intersection. This is due to the extremely small thickness of the word wire 2'' between its inner and outer surfaces.

Figure 6:
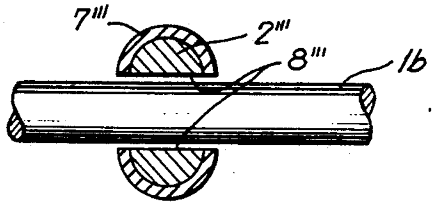
FIG. 6 is a sectional view of a portion of a memory matrix including still another modification of the embodiment of FIG. 3.

In the modification of FIG. 6, the word wire 2''' is of semicircular cross-section. In FIG. 6, the soft magnetic material 7''' covers the entire surface of the electrically conducting core, except the portions 8''' which are in operative proximity or electrical contact with the memory wire **1*b***.

In a working embodiment of the memory device of the present invention, the electrically conducting cores of the memory wires were phosphor bronze having a diameter of 0.2 and were coated with a nickel-iron alloy having a ratio of nickel to iron of 81:19 in a thickness of 4000 A. The electrically conducting cores of the word wires were three copper wires each having a diameter of 0.06 interwound in Litz arrangement with each other and were coated with a nickel-iron alloy having a ratio of nickel to iron of 81:19 in a thickness of 1 micron. The space between adjacent word wires was reduced from 2.0 mm. to 1.0 mm. without reduction in operating reliability.

While the invention has been described by means of specific examples and in specific embodiments, I do not wish to be limited thereto, for obvious modifications will occur to those skilled in the art without departing from the spirit and scope of the invention.

I claim:

1. In a thin film memory device comprising a matrix arrangement having a plurality of memory conductors and a plurality of word conductors positioned in determined relation to each other and each positioned in determined relation to the others, each of said word conductors having a surface area, each of said memory conductors being in operative proximity with each of said word conductors at determined areas and each of said word conductors being in operative proximity with each of said memory conductors at said determined areas, each of said word conductors being of substantially elongated narrow U configuration having one portion in close operative proximity with one part of the surface of each of said memory conductors and another portion in close operative proximity with another diametrically opposite part of the surface of each of said memory conductors, a coating of soft magnetic material on each of said word conductors covering the surface area of each of said word conductors except in the areas of close operative proximity with said memory conductors.

2. In a thin film memory device as claimed in claim 1, wherein each of said memory conductors is in electrical contact with each of said word conductors at said determined areas and said coating of soft magnetic material covers the surface area of each of said word conductors except in the areas of electrical contact with said memory conductors.

3. In a thin film memory device as claimed in claim 1, wherein each of said memory conductors is coated with ferromagnetic material having characteristics of uniaxial magnetic anisotropy.

4. In a thin film memory device as claimed in claim 1, wherein said soft magnetic material comprises an alloy of nickel and iron.

5. In a thin film memory device as claimed in claim 1, wherein said soft magnetic material comprises an alloy of nickel, iron and molybdenum.

6. In a thin film memory device as claimed in claim 1, wherein each of said memory conductors is covered with Permalloy and said soft magnetic material comprises molybdenum Permalloy.

7. In a thin film memory device as claimed in claim 6, wherein each of said memory conductors is of circular cross-section and each of said word conductors is of circular cross-section.

8. In a thin film memory device as claimed in claim 7, wherein each of said memory and word conductors is of rectangular cross-section.

9. In a thin film memory device as claimed in claim 7, wherein each of said memory and word conductors is of semicircular cross-section.

References Cited

UNITED STATES PATENTS

| | | | |
|---|---|---|---|
| 3,083,353 | 3/1963 | Bobeck | 340—174 |
| 3,105,962 | 10/1963 | Bobeck | 340—174 |
| 3,264,619 | 8/1966 | Riseman et al. | 340—174 |
| 3,349,382 | 10/1967 | Naylor et al. | |

STANLEY M. URYNOWICZ, Jr., Primary Examiner